US010471426B2

(12) United States Patent
Martineau et al.

(10) Patent No.: US 10,471,426 B2
(45) **Date of Patent: *Nov. 12, 2019**

(54) MICROFLUIDIC DEVICE AND ARRAY DISK

(71) Applicant: Arizona Board of Regents on behalf of Arizona State University, Scottsdale, AZ (US)

(72) Inventors: Rhett Martineau, Gilbert, AZ (US); Jeff Houkal, Los Angeles, CA (US); Shih-Hui Chao, Phoenix, AZ (US); Weimin Gao, Chandler, AZ (US); Shufang Ci, Tempe, AZ (US); Deirdre Meldrum, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,464

(22) Filed: Jul. 13, 2018

(65) Prior Publication Data

US 2018/0318835 A1 Nov. 8, 2018

Related U.S. Application Data

(63) Continuation of application No. 14/922,696, filed on Oct. 26, 2015, now Pat. No. 10,022,718.

(Continued)

(51) Int. Cl.

*B01L 3/00* (2006.01)
*G01N 35/00* (2006.01)

(Continued)

(52) U.S. Cl.

CPC ..... *B01L 3/502715* (2013.01); *B01L 3/50273* (2013.01); *B01L 3/502723* (2013.01);

(Continued)

(58) Field of Classification Search

CPC ............ G01N 35/00; G01N 1/10; B01L 3/00

(Continued)

(56) References Cited

U.S. PATENT DOCUMENTS

| | | | | |
|---|---|---|---|---|
| 10,022,718 | B2 * | 7/2018 | Martineau | B01L 3/502715 |
| 2003/0190608 | A1 * | 10/2003 | Blackburn | B01J 19/0093 435/6.11 |

(Continued)

OTHER PUBLICATIONS

Rivkin et al., Biogenic Carbon Cycling in the Upper Ocean: Effects of Microbial Respiration., Science, Mar. 2001, 291(5512):2398-2400.

(Continued)

*Primary Examiner* — Brian J. Sines

(74) *Attorney, Agent, or Firm* — Rodney J. Fuller; Booth Udall Fuller, PLC

(57) ABSTRACT

The invention relates to microfluidic devices and array disks for "one-pot" isolated chemical reactions. The array disks comprise a plurality of sectors in which each sector comprises one microfluidic device. The microfluidic devices comprise a fluid delivery channel and an array of wells wherein the fluid delivery channel delivery fluid into the wells in a serpentine arrangement. In some embodiments, the fluid delivery channel is directly above the array of wells. In other embodiments, the fluid delivery channel is offset from the array of wells so that side channels branching from the fluid delivery channel delivers fluid into the wells. The well of the microfluidic device comprises a gas-permeable membrane that forms the floor, well, or at least a portion of the floor or wall of the well. In preferred embodiments, the well is cylindrical.

19 Claims, 6 Drawing Sheets

Related U.S. Application Data

(60) Provisional application No. 62/068,457, filed on Oct. 24, 2014.

(51) Int. Cl.
*G01N 1/10* (2006.01)
*B01L 7/00* (2006.01)

(52) U.S. Cl.
CPC ......... *B01L 7/52* (2013.01); *B01L 2200/0605* (2013.01); *B01L 2200/0642* (2013.01); *B01L 2200/0647* (2013.01); *B01L 2200/0684* (2013.01); *B01L 2300/044* (2013.01); *B01L 2300/0636* (2013.01); *B01L 2300/0681* (2013.01); *B01L 2300/0803* (2013.01); *B01L 2300/0829* (2013.01); *B01L 2300/0851* (2013.01); *B01L 2300/0864* (2013.01); *B01L 2300/0883* (2013.01); *B01L 2300/161* (2013.01); *B01L 2400/049* (2013.01); *B01L 2400/0683* (2013.01)

(58) Field of Classification Search
USPC ......... 422/68.1, 502, 503, 504; 436/43, 174, 436/180
See application file for complete search history.

(56) References Cited

U.S. PATENT DOCUMENTS

| | | | | |
|---|---|---|---|---|
| 2005/0009101 | A1* | 1/2005 | Blackburn | B01L 3/5027 435/7.1 |
| 2005/0136545 | A1* | 6/2005 | Schmid | B01L 3/50273 436/45 |
| 2005/0266582 | A1* | 12/2005 | Modlin | B01L 3/5027 436/164 |
| 2008/0227663 | A1* | 9/2008 | Tisone | B01J 19/0046 506/39 |
| 2008/0233018 | A1* | 9/2008 | van Dam | B01J 19/0093 422/159 |
| 2011/0312841 | A1* | 12/2011 | Silverbrook | B01L 3/5027 506/40 |

OTHER PUBLICATIONS

Arrigo, Marine Microorganisms and Global Nutrient Cycles., Nature, Sep. 2005, 437(7057):349-355.
Le Quere et al., Ecosystem Dynamics Based on Plankton Functional Types for Global Ocean Biogeochemistry Models., Global Change Biology, Nov. 2005, 11(11):2016-2040.
Falkowski et al., The Microbial Engines That Drive Earth's Biogeochemical Cycles., Science, May 2008, 320 (5879):1034-1039.
Robidart et al., Seasonal Synechococcus and Thaumarchaeal Population Dynamics Examined with High Resolution with Remote in Situ Instrumentation., ISME Journal, Mar. 2012, 6(3):513-523.
Van Dolah, Marine Algal Toxins: Origins, Health Effects, and Their Increased Occurrence., Environmental Health Perspectives, Mar. 2000, 108(s1):133-141.
Littler et al., Harmful Algae on Tropical Coral Reefs: Bottom-up Eutrophication and Top-down Herbivory., Harmful Algae, 2006,5(5):565-585.
Blair et al., Naegleria Fowleri in Well Water., Emerging Infectious Diseases, Sep. 2008, 14(9):1499-1501.
Follows et al., Emergent Biogeography of Microbial Communities in a Model Ocean., Science, Mar. 2007, 315(5820):1843-1846.
Malone et al., Enhancing the Global Ocean Observing System to Meet Evidence Based Needs for the Ecosystem-Based Management of Coastal Ecosystem Services., Natural Resources Forum, Aug. 2014, 38(3):168-181.
Souza et al., An Endangered Oasis of Aquatic Microbial Biodiversity in the Chihuahuan Desert, PNAS USA, Mar. 2006, 103(17):6565-6570.
Wang et al., Pyrosequencing Analysis of Bacterial Diversity in 14 Wastewater Treatment Systems in China., Applied and Environmental Microbiology, Oct. 2012, 78(19):7042-7047.
Ottesen et al., Multispecies Diel Transcriptional Oscillations in Open Ocean Heterotrophic Bacterial Assemblages., Science, Jul. 2014, 345(6193):207-212.
Goto et al., Colorimetric detection of loop-mediated isothermal amplification reaction by using hydroxy naphthol blue., BioTechniques, Mar. 2009, 46(3):167-172.
Paul et al., In Situ Instrumentation., Oceanography, Jun. 2007, 20(2):70-78.
Tsaloglou et al., Real-Time Isothermal RNA Amplification of Toxic Marine Microalgae Using Preserved Reagents on an Integrated Microfluidic Platform., Analyst, Jan. 2013, 138(2):593-602.
Greenfield et al., Application of Environmental Sample Processor (ESP) Methodology for Quantifying Pseudo Nitzschia Australis Using Ribosomal RNA-Targeted Probes in Sandwich and Fluorescent in Situ Hybridization Formats., Limnology and Oceanography:Methods, Dec. 2006, 4(11):426-435.
Scholin et al., What are "ecogenomic sensors?" A review and thoughts for the future., Ocean Science, 2010, 6(1):51-60.
Ottesen et al., Metatranscriptomic Analysis of Autonomously Collected and Preserved Marine Bacterioplankton., ISME Journal, Dec. 2011, 5(12):1818-1895.
Fukuba et al., Integrated in Situ Genetic Analyzer for Microbiology in Extreme Environments., RSC Advances, Nov. 2011, 1(8):1567-1573.
Casper et al., A Handheld NASBA Analyzer for the Field Detection and Quantification of Karenia Brevis., Harmful Algae, 2007, 6(1):112-118.
Goffredi et al., Molecular Detection of Marine Invertebrate Larvae., Marine Biotechnology, Apr. 2006, 8(2):149-160.
Jones et al., A Robotic Molecular Method for in Situ Detection of Marine Invertebrate Larvae., Molecular Ecology Resources, May 2008, 8(3):540-550.
Preston et al., Underwater Application of Quantitative PCR on an Ocean Mooring., PLOS One, Aug. 2011, 6(8):e22522.
Hatch et al., Continuous Flow Real-Time PCR Device Using Multi-Channel Fluorescence Excitation and Detection., Lab on a Chip, Dec. 2013, 14(3):562-568.
Wintzingerode et al., Determination of microbial diversity in environmental samples: pitfalls of PCR-based rRNA analysis., FEMS Microbiology Reviews, Nov. 1997, 21(3):213-229.
Tanner et al., Simultaneous Multiple Target Detection in Real-Time Loop-Mediated Isothermal Amplification., BioTechniques, Aug. 2012, 53(2):81-89.
Meng et al., Rapid and Sensitive Detection of Plesiomonas Shigelloides by Loop-Mediated Isothermal Amplification of the hugA Gene., PLOS One, Oct. 2012, 7(10):e41978.
Zhang et al., Brief Review of Monitoring Methods for Loop-Mediated Isothermal Amplification (LAMP)., Biosensors & Bioelectronics, Nov. 2014, 61:491-499.
Suzuki et al., Development of the Loop-Mediated Isothermal Amplification Method for Rapid Detection of Cytomegalovirus DNA, Journal of Virological Methods, 2006, 132(1):216-221.
Bakheit et al., Sensitive and Specific Detection of Cryptosporidium Species in PCR-Negative Samples by Loop-Mediated Isothermal DNA Amplification and Confirmation of Generated LAMP Products by Sequencing., Veterinary Parasitology, Nov. 2008, 158(1):11-22.
Schneider et al., Real-Time Nucleic Acid Sequence-Based Amplification is More Convenient than Real-Time PCR for Quantification of Plasmodium Falciparum., Journal of Clincal Microbiology, Jan. 2005, 43(1):402-405.
Aoi et al., Real-Time Quantitative Lamp (loop-Mediated Isothermal Amplification of DNA) as a Simple Method for Monitoring Ammonia-Oxidizing Bacteria., Journal of Biotechnology, Oct. 2006, 125(4):484-491.
Peng et al., Development of a Real-Time Fluorescence Loop-Mediated Isothermal Amplification Assay for Rapid and Quantitative Detection of *Fusarium oxysporum* F. Sp. *Niveum* in Soil., FEMS Microbiology Letters, Dec. 2013, 349(2):127-134.

(56) References Cited

OTHER PUBLICATIONS

Curtis et al., Rapid Detection of HIV-1 by Reverse-Transcription, Loop-Mediated Isothermal Amplification (RT-LAMP)., Journal of Virological Methods, Aug. 2008, 151(2):264-270.
Wang et al., Using Luminescent Nanoparticles as Staining Probes for Affymetrix GeneChips., Bioconjugate Chemistry, May 2007, 18(3):610-613.
Nagamine et al., Loop-Mediated Isothermal Amplification Reaction Using a Nondenatured Template., Clinical Chemistry, Sep. 2001, 47(9):1742-1743.
Martineau et al., Deep-well microfluidics for arrayed colorimetric LAMP analysis., 18th International Conference on Miniaturized Systems for Chemistry and Life Sciences, MicroTAS 2014, 1009-1011.
Notomi et al., Loop-mediated isothermal amplification of DNA., Nucleic Acids Research, Jun. 2000, 28(12):e63.
Surabattula et al., Simple, rapid, inexpensive platform for the diagnosis of malaria by loop mediated isothermal amplification (LAMP)., Experimental Parasitology, Jul. 2013, 134(3):333-340.

* cited by examiner

MICROFLUIDIC DEVICE AND ARRAY DISK

RELATED APPLICATIONS

This application is a continuation of U.S. patent application Ser. No. 14/922,696, filed on Oct. 26, 2015 (published as US20160114323), which claims the benefit of U.S. provisional patent application 62/068,457, filed Oct. 24, 2014 titled, “Quantitative, Multi-Target, or Highly Replicated LAMP Analysis Device and Method,” the contents of each of which are incorporation by reference in their entireties.

TECHNICAL FIELD

This application relates to diagnostic devices, particularly devices for “one-pot” isolated chemical reactions. Specifically, this application relates to microfluidic devices in which the “one-pot” isolated chemical reactions take place and are analyzed. Thus the application relates to devices enable automatic measurements during fieldwork, such as automatic analysis of microbes in their native aquatic environment.

BACKGROUND OF THE INVENTION

As stated by Dr. John C. Wingfield, the ultimate frontier in biology is taking the lab to the field to study organisms in their environments. Dr. Wingfield’s assessment is even more important in the study of aquatic environments. Aqueous microbes constitute a hidden majority of life on earth, and comprise the most diverse group of organisms on our planet. They are the key players in global carbon cycling and other biogeochemical processes that broadly affect the health of the planet. However, they are among the most under-studied life forms because of the vastness of their often inaccessible habitats and their ‘patchy’ distribution.

Aquatic microbes are interesting on a species level as well as on a community level. On a species level, certain harmful algae are of public interest due to their ability to infect fish populations and transmit toxins to humans and the ecosystems. Others, such as *Naegleria fowleri*, a freshwater amoeba, infect humans directly often leading to death. Aquatic microbes are also very interesting on a community scale. Indeed, key questions of environmental microbiology include “who are the members of the microbial community” and “which members are the major contributors to community dynamics.” Understanding these key microbial players and the dynamic interactions among them and their environments are of great societal interest. Models regarding ocean acidification, carbon cycling, climate change, species adaptation, and the effects of geochemical perturbations are underdeveloped and require increased understanding of microbial population dynamics. The technical requirements for monitoring microbes in their natural environment are extremely demanding, at least because they are to be deployed remotely and conduct automatic in situ measurements.

While development of technologies for systems biology has made it more feasible to study the interaction of microorganism in aquatic environment, much of the technological developments are limited to in-lab instruments. Although there are bench-top microfluidic platforms for analysis of aquatic organisms, these platforms are unsuitable for autonomous microbial genomic profiling. Unlike bench-top instruments, instruments for autonomous in situ genomic instruments require robust fluidic handling, low energy consumption, long-term reagent storage (especially for enzymes), and easy portability. Additionally, being situated in the field, autonomous in situ genomic instruments cannot reply on pressurized gas, continuous vacuum, refrigeration, or manual intervention.

In addition to obstacles in the workability of an automatic in situ genomic instrument, there are heavy burdens in maintaining the function of such an instrument. In situ genomic sensors are expensive and require large payloads of batteries to achieve relatively short deployment time. Unfortunately, the assay performance is often insufficient. Accordingly, there is a need to develop an in situ device with improved energy consumption, reduced running costs, increased per-unit throughput that at least retains the analytical assay performance of existing in situ genomic sensors.

SUMMARY OF THE INVENTION

The invention is directed to microfluidic devices comprising a fluid delivery channel and an array of wells. In preferred embodiments, the fluid delivery channel is in a serpentine order over the array of wells. The width of the fluid delivery channel is preferably about the same as the diameter the opening of each well and the fluid delivery channel preferably position substantially directly over the wells to reduce the chance of entrapping bubbles during the well loading process. The width of the fluid delivery channel reduces the chance of the liquid from bridging over an air pocket. In width of the fluid delivery channel is between 1/20 to 2.5 times the diameter of the well, for example, between 1/20 to two times the diameter of the well, between 1/10 to two times the diameter of the well, or between 1/10 to 2.5 times the diameter of the well. Preferably the width of the fluid delivery channel is between 1/10 the diameter of the well to the same length as the diameter of the well. In more preferred embodiments, the width of the fluid delivery channel are between 1/10 to 1/4 the diameter of the well. The diameter of the well may be between 200 to 2000 μm. Thus the width of the fluid delivery channel may be between 10 to 5000 μm, for example, between 10 to 500 μm, between 15 to 750 μm, between 17.5 to 875 μm, between 30 to 1500 μm, between 40 to 2000 μm, between 75 to 3750 μm, between 100 to 5000 between 15 to 750 between 30 to 600 between 30 to 1200 between 30 to 75 between 30 to 150 between 35 and 700 between 35 and 87.5 between 35 and 200 or between 35 and 1600 μm.

In other preferred embodiments, the path of the fluid delivery channel is offset from array of well such that the fluid is directed to the opening of each well by a side channel. This arrangement facilitates delivery of different reagents so that the wells in the array may contain different chemical reactions. In these embodiments, the fluid flow channel may be on the same plane as the opening of the wells and is not substantially over opening of the wells. Thus in some embodiments, the microfluidic device comprises multiple layers. In the case where the fluid delivery channel is substantially over the array of wells and the opening of each well, the device may comprise three layers—a top layer comprising the fluid delivery channel, a middle layer comprising the array of wells, and a bottom layer comprising a reservoir. In the case where the fluid delivery channel is offset from the opening of each well, the device may comprise the three layers as described or two layers, where the top layer comprises the fluid delivery channel and the array of wells and the bottom layer comprising a reservoir.

In certain embodiment, the microfluidic device addresses the problem of air bubbles during fluid loading of microfluidic devices by enabling vacuum loading where excess air may be pushed out of the wells without dislodging the aqueous content. Accordingly, in these embodiments a reservoir is included below the array of wells to enable fluid flow between the layers of the microfluidic device. In certain embodiments, membranes permeable to certain selected fluids are elements of the layers of the microfluidic device. For example, fluid in the middle layer is kept from the bottom layer by a gas-permeable membrane.

In some aspects, this gas-permeable membrane is forms the floor or wall or a portion thereof of the individual wells of the array. Thus the gas permeable membrane may be part of the top layer or the middle layer of the microfluidic device. Any air in the fluid delivery channel or the wells may be pushed out of the wells and toward the reservoir by the force of the vacuum.

In some embodiments, the top layer may further comprise a barrier membrane that covers at least a portion of the fluid delivery channel. In some embodiments, the barrier membrane completely covers fluid delivery channel to isolate the fluid from the ambient environment. In other embodiments, another covering may be used to isolate the fluid in the fluid delivery channel from the ambient environment, for example the covering may be the same material from which the fluid delivery channel is carved. In these embodiments, the barrier membrane may cover only the portion of the fluid delivery channel, for example, over the inlet region of the fluid delivery channel, such as the one for delivering reaction reagents and the one for delivering oil into the device. In preferred embodiments, the barrier membrane may be punctured, for example, by a retractable needle from an automated instrument that delivery fluids such as reagents or oil.

The microfluidic device is preferably used for conducting "one-pot" isolated chemical reactions and analyzing the reactions optically. Though there is no requirement for the aspect ratio of the array of wells, lower aspect ratios are more suitable for fluorescence- or bioluminescence-based optical analysis of the reactions while higher aspect ratios may be better when optical analysis involves colorimetric or turbidometric measurements, because higher aspect ratio facilitate lower concentrations of indicators dyes. Another way to lower the concentration of indicators dyes needed for colorimetric or turbidometric measurements is providing a long optical pathlength, for example by providing deep wells. In some embodiments, wells may be at least 750 μm tall or at least 850 μm tall. The structure of the microfluidic device address the problem of bubble formation during loading is the design of the wells—the well geometry should lack sharps and sudden profile changes. Thus, in preferred embodiments, the wells are cylindrical.

The invention is also directed to an array disk. The array disk preferably comprises multiple sectors with each sector comprising a microfluidic device as described herein. In preferred embodiments, the array disk comprises 50 or more sectors and the microfluidic device comprises 40 or more wells. Accordingly, in a specific embodiment, the array disk supports 50 sample events, wherein up to 40 microbial species may be targeted per sample event.

In certain non-limiting embodiments, the array disk comprises multiple sectors arranged in a circle so that the array disk may be rotated once a sector has been used to expose a fresh sector for the next sample event.

BRIEF DESCRIPTION OF THE DRAWINGS

FIG. 1A shows the top-view of the device designed to load colorimetric reagents into deep wells. FIG. 1B details the serpentine delivery channel and the tubular wells. FIGS. 1C and 1D detail vacuum loading of LAMP reagents (FIG. 1C) and oil loading for well isolation (FIG. 1D).

FIG. 2A shows loading of LAMP reagents with HNB into the wells by vacuum in serpentine flow path. FIGS. 2B and 2C show the process in which pressure-driven oil displaces the aqueous phase along the serpentine flow path. FIG. 2D depicts arrangement in which the fluid delivery channel is offset from the opening of the wells.

FIG. 3A shows the distinct hue values associated with negative (middle column) and positive (right column) LAMP reaction solutions. FIG. 3B shows an on-chip, real-time reaction.

FIG. 5A depicts the fluidic schematic where six flow paths each contain a valve. FIG. 5B depicts DNA collection and preparation. FIG. 5C depicts the flow of DNA into the wells of the microfluidic disk. FIG. 5D depicts the oil flow to isolate wells for the performance of an experiment.

DETAILED DESCRIPTION OF THE INVENTION

The verb "comprise" as is used in this description and in the claims and its conjugations are used in its non-limiting sense to mean that items following the word are included, but items not specifically mentioned are not excluded. In addition, reference to an element by the indefinite article "a" or "an" does not exclude the possibility that more than one of the elements are present, unless the context clearly requires that there is one and only one of the elements. The indefinite article "a" or "an" thus usually means "at least one."

As used herein, the term "fluid" refers to a substance that continually deforms or flows under an applied shear stress. Thus the term fluid includes liquids, gases, and plasmas.

The invention provides, among other things, a microfluidic device 9 suitable for "one-pot" isolated chemical reactions where the reactions are analyzed optically. The one-pot reaction may be loop-mediated isothermal amplification (LAMP), which has great potential for sensitive and selective genetic analysis in resource limited settings. The microfluidic device 9 comprises a fluid delivery channel 11 that delivers fluidic samples and reaction reagents into an array of wells 21.

The array of wells 21 may have unrestricted aspect ratio. Lower aspect ratios may be suitable for fluorescence- or bioluminescence-based optical analysis of the reactions. On the other hand, higher aspect ratios facilitate lower concentrations of indicators dyes when colorimetric or turbidometric approaches are employed to optically measure the reactions. The reaction volumes may be further reduced in applications requiring higher aspect ratio of the array of wells 21 by having providing a long optical pathlength for the optical analysis, for example by having deep wells. In some embodiments, the aspect ratio is greater than 1. The array of wells 21 may contain 9 or more wells, for example, 40 or more wells.

Figure 1B:
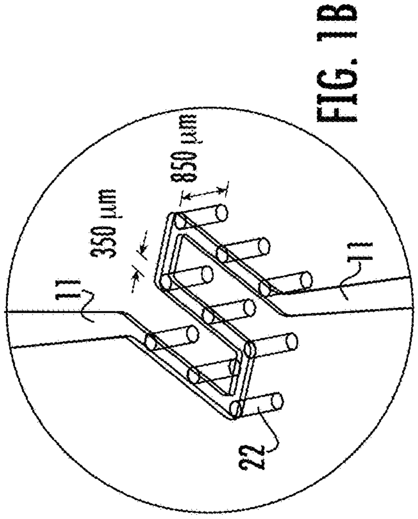
FIGS. 1A-1D depict a long optical path length microfluidic device design.

In preferred embodiments, the ratio of the depth of the wells to the diameter of the wells is between 1:2 to 10:1, for example, 1:2 to 7.5:1, 1:2 to 5:1, 1:2 to 2.5:1, 1:1 to 10:1, 1:1 to 7.5:1, 1:1 to 5:1, or 1:1 to 2.5:1. The diameter, or width, of a well is no more than 2000 μm. For example, the diameter of the well is between 200 to 2000 μm, between 200 to 1500 μm, between 200 to 800 μm, between 300 to 2000 μm, between 300 to 1500 μm, between 300 to 800 μm, or between 300 to 600 μm. In some embodiments, the diameter of the well is between 350 to 1500 μm, preferably between 350 to 800 μm. In some embodiments, the width of each well is about 350 μm (FIG. 1B). Accordingly, the depth of the well is at least 100 μm. For example, the depth of the well is between 100 to 15000 μm, between 100 to 2000 μm, between 750 to 15000 μm, between 400 to 8000 μm, between 150 to 3000 μm, between 300 to 6000 μm, between 175 to 3500 μm, between 150 to 1500 μm, between 300 to 750 μm, between 300 to 600 μm, between 300 to 1500 μm, between 175 to 1750 or between 350 to 875 In some embodiments, the wells 22 may be at least 750 μm tall, at least 850 μm tall, about 750 or about 850 These wells 22 may contain about 100 nL reaction fluid.

To prevent bubbles from being trapped during well-loading of the microfluidic device, it is preferable for the well geometry to have reduced profile changes. For example, the wells should lack angles, thus cylinder-shaped wells would be preferred over a prism-shaped wells. However, the microfluidic device may comprise prism-shaped wells. The instance of bubble formation during loading may be further reduced in embodiments where each well comprises a hydrophilic coating 23 and/or a gas-permeable membrane 24. The gas-permeable membrane 24 forms the floor, wall, or a portion of the floor or wall each well. The placement of the gas-permeable membrane 24 on the well floor or in a ring (wall of a cylindrical well) creates a venting geometry that prevents bubbles from being trapped during loading. In some embodiments, the gas-permeable membrane 24 is hydrophobic. The gas-permeable hydrophobic membrane 24 enables gases to pass through but prevents the passage of the aqueous reaction fluid. In one application, during loading, vacuum is applied beneath the gas-permeable membrane so that the vacuum draws the aqueous reaction fluid into the wells 22 until air is completely evacuated and the liquid completely fills the well. In some aspects, the gas-permeable membrane 24 comprises polypropylene. In one embodiment, the gas-permeable membrane 24 comprises a pore size of between 0.3 to 30 for example between 0.40 and 0.50 μm or about 0.45 μm.

Figure 1C:
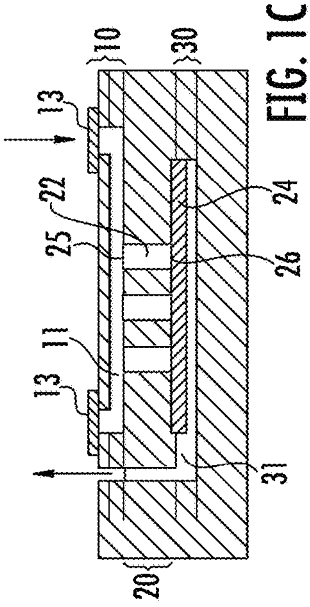
Figure 1D:
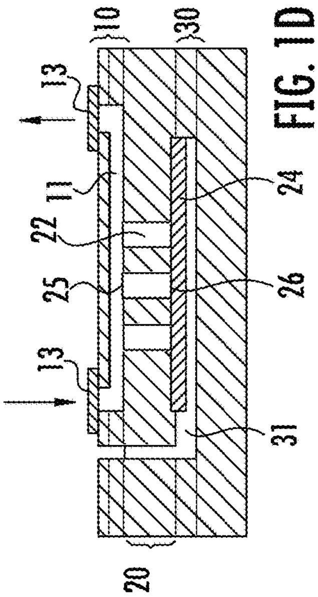
Figure 1A:
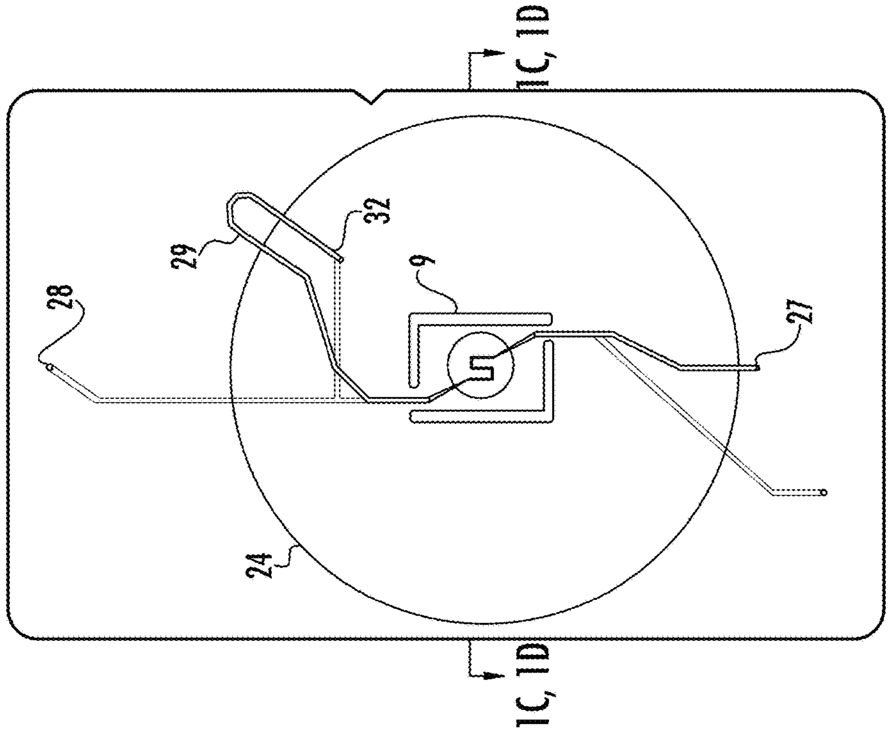

A side view of the microfluidic device 9 reveals that the device may be divided into three layers (see FIGS. 1C and 1D)—top 10, middle 20, and bottom 30 layers. The top layer 10 comprises the fluid delivery channel 11. In some embodiments, the top layer may further comprise a barrier membrane 13 cover the surface of the top layer 10. In some aspects, the barrier membrane 13 is penetrable by a needle for delivery of fluids. The barrier membrane 13 is preferably made of polypropylene and/or hydrophobic. In some embodiments, the barrier membrane 13 may be a filter disk that rests over the fluid delivery channel 11. The middle layer comprises the array of wells 21. In some embodiments, the middle layer is in contact with both the top layer 10 and the bottom layer 30. Specifically, the top opening of the wells 25 meets the top layer 10 while the bottom opening of the wells 26 meets the bottom layer 30. In some embodiments, the microfluidic device 9 may be divided into just top 10 and bottom 30 layers. In these embodiments, the top layer 10 comprises the fluid delivery channel 11 and the array of wells 21, and the fluid delivery channel 11 is not necessary completely above the array of wells. For example, the fluid delivery channel 11 may be on the same plan as the top opening of the wells 25.

Figures 2A, 2B, 2C, 2D:
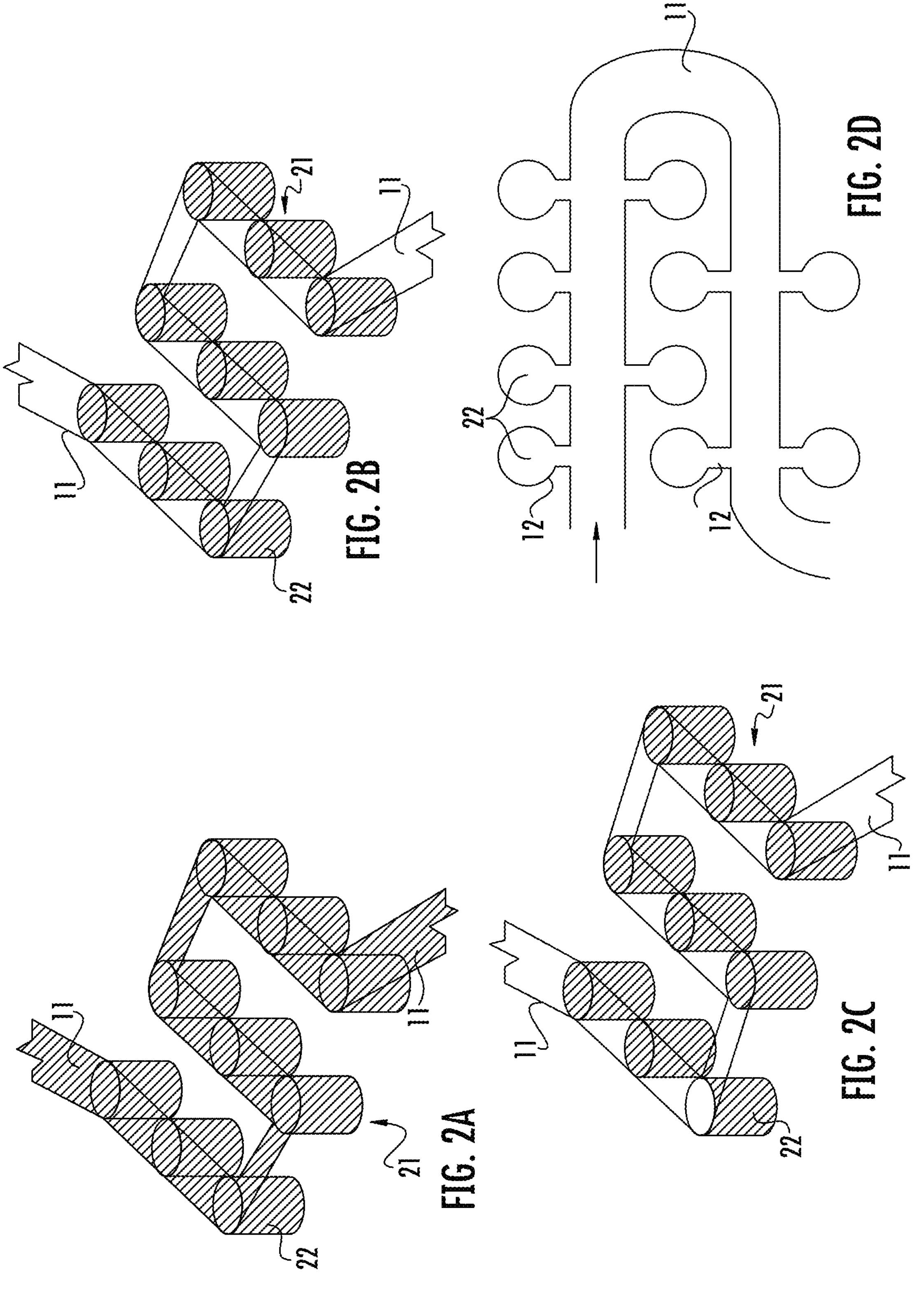
FIGS. 2A-2D depict the process of fluid loading in the microfluidic device.

The microfluidic device 9 may comprise two partitioning configurations. The two partitioning configurations differ in the flow of the fluid delivery channel 11. One configuration promotes numerous reactions replicates on one device. Useful applications for this configuration include replicated assessment of a sample for one or a set of analytical targets. In this configuration, the fluid delivery channel 11 is positioned directly above the top opening of each of the wells 25 (FIGS. 1B and 2A-D). Thus the width of the fluid delivery channel may be about the same as the diameter of the wells (FIGS. 1B and 2A-D). The other configuration promotes numerous distinct chemical reactions for analyzing a single sample. Useful applications for this configuration include analyzing the single sample for multiple analytical targets, includes having a control reaction on the device. This fluid delivery channel in this configuration further comprises side channels 12 that branch from the fluid delivery channel 11 (FIG. 2D). The side channel 12 diverts fluid from the fluid delivery channel 11 prior to the fluid entering each well 22, which enables the wells to contain distinct chemical constituents in support of distinct chemical reactions per well.

For optimal design, the smaller the width of the fluid delivery channel and side channel the better as long as fluidic resistance or channel resistance does not become an issue. Accordingly, the width of the fluid delivery channel and of the side channel may be 1/10 to twice the diameter of a well. In preferred embodiments, the width of the fluid delivery channel and of the side channel (when present) is 1/10 the diameter of the well to the same as the diameter of the well. Most preferably, the width of the fluid delivery channel and of the side channel (when present) is 1/10 to 1/4 the diameter of the well. In some embodiments, the width of the side channel is no more than width of the fluid delivery channel.

Regardless of the partitioning configuration, the path of the fluid delivery channel 11 and the order in which wells 22 are filled follow a serpentine pattern (see FIGS. 1A, 1B, 2A, and 2B). As such, the fluid delivery channel 11 fills an entire column of wells 22 before the fluid delivery channel 11 changes direction in order to fill the next column of wells 22.

Figure 4:
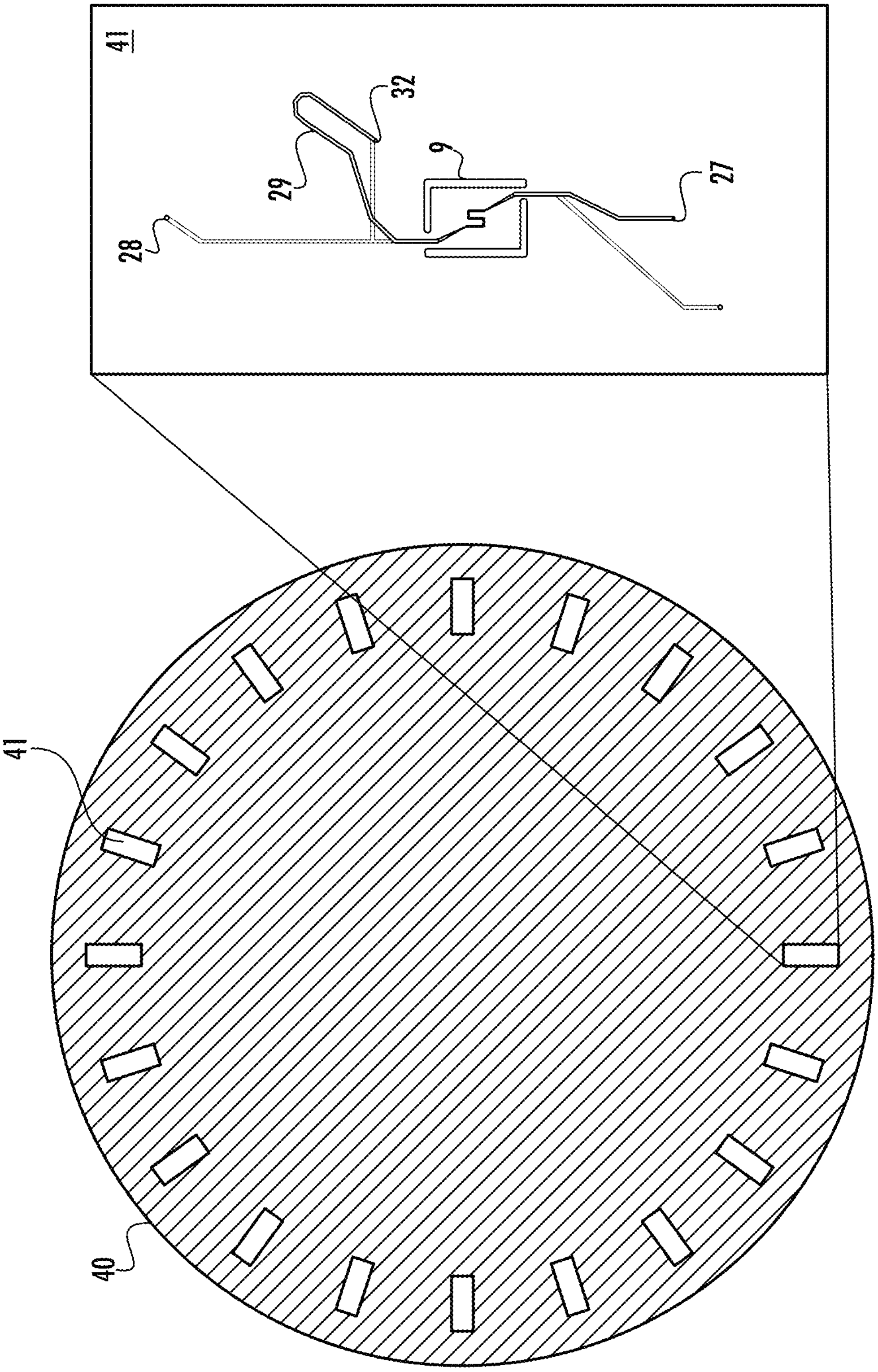
FIG. 4 depicts an exemplary embodiment of the array disk comprising a plurality of the microfluidic devices.
Figure 5A:
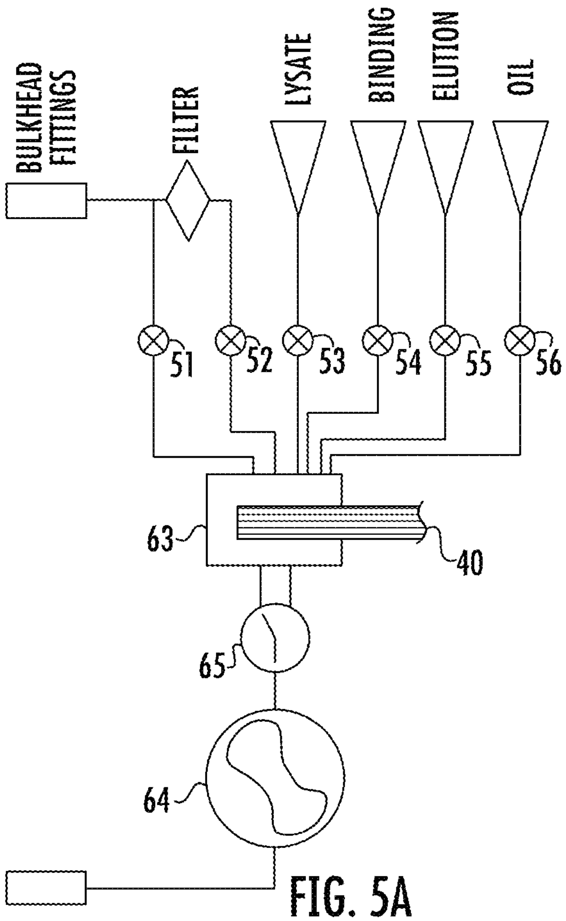
FIGS. 5A-5D depicts how the microfluidic disk may be used in a fluid handling system for analysis of samples.
Figure 5B:
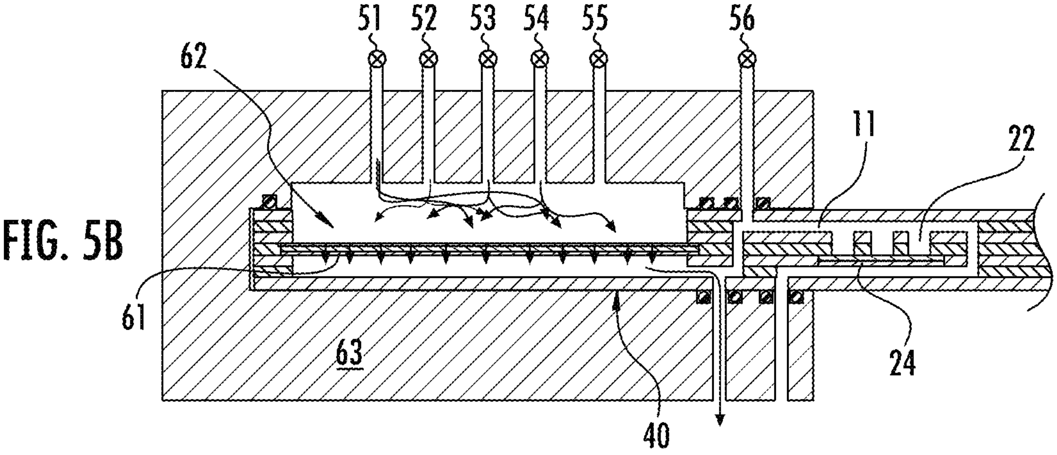
Figure 5C:
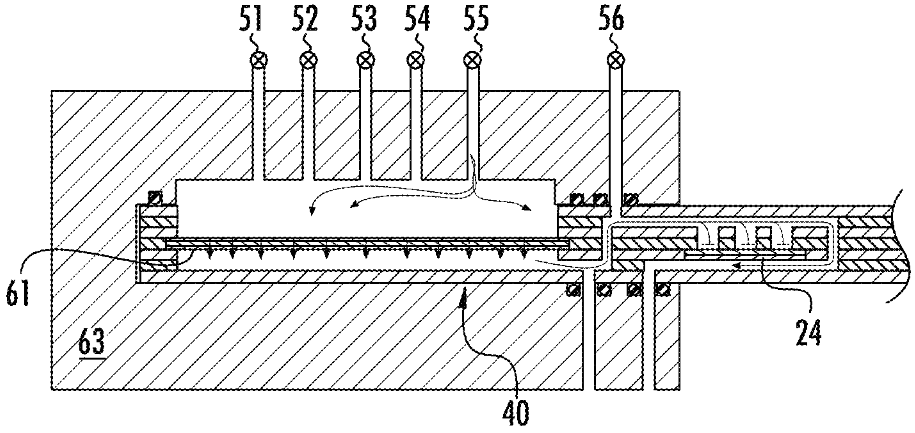
Figure 5D:
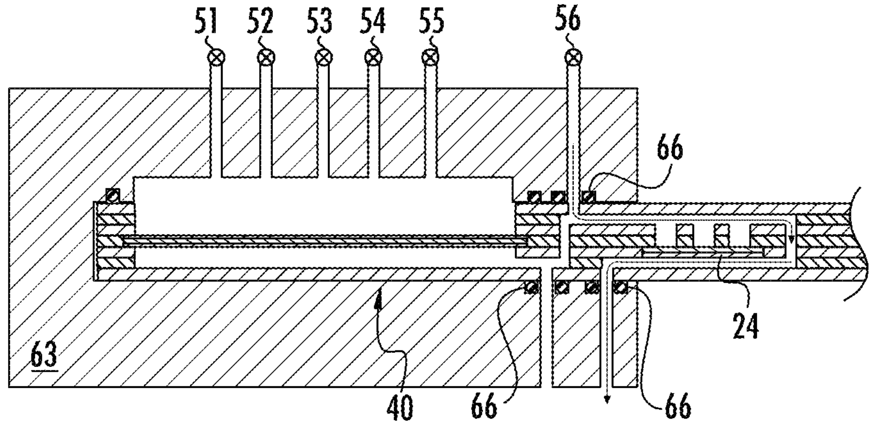

The invention is also directed to an array disk 40 comprising a plurality of the microfluidic device 9 in sectors 41, where each sector 41 comprises one microfluidic device 9. In preferred embodiments, the sectors are in a circular arrangement on the array disk 40 (FIG. 4). This arrangement facilitated automated sampling, because the array disk 40 may be rotated once one microfluidic device 9 has been used to expose a fresh microfluidic device 9 for the next sample event. The multiple sectors 41 in an array disk 40 support multiple sample events, and the array of wells 21 in the microfluidic device 9 enables a sample event to analyze multiple targets. For example, in an array disk 40 comprising 50 sectors 41 with each sector comprising 40 wells 22, the array disk 40 may be used for 50 sample events. If the partitioning configuration of the microfluidic device comprises a fluid delivery channel 11 that is offset from the array of wells 21, up to 40 microbial species may be targeted in one sample event. However, if the partitioning configuration of the microfluidic device comprises a fluid delivery channel 11 that over the array of wells 21, each sample event may result in 40 replicated analysis of one target.

EXAMPLES

The invention is further illustrated by the following examples that should not be construed as limiting. The contents of all references, patents, and published patent applications cited throughout this application, as well as the Figures, are incorporated herein by reference in their entirety for all purposes.

1. Sample Handling in an Automated System

Sample is drawn through the bulkhead at the top of the schematic (FIG. 5), through valve 51 which is opened, passes through the bacteria filter 61 of the microfluidic disk 40 which is captured by the manifold 63, and pulled out of the system via the metering pump 64. The metering pump 64 allows the passage of precise volumes of sample, buffer, and reagents. Once a predetermined volume of sample water has passed through the bacteria filter 61, valve 51 is closed and valves 53 and 54 are opened. This introduces lysis buffer then beads with binding buffer to capture the released DNA. Once the DNA has had sufficient time to bind to the beads, valve 52 is opened; this pulls sample water through a 2 μm filter, making the water clean, and using that clean water to wash the beads and filter of unwanted cell contents. During all these processes the volume of reagent pulled into the bacteria filter area 62 is precisely controlled by the metering pump 64. With clean DNA coated beads on the bacteria filter the "switch" 65 changes to position 2, which drives the flow path through the channels of the microfluidic disk 40. Valve 55 is opened and elution buffer releases the DNA from the beads and passes the clean DNA solution into the channels of the microfluidic disk 40 and into the fluid delivery channel 11 of the microfluidic device 9. The metering pump 64 will also pull oil into the microfluidic disk 40 via the oil inlet port 29 by opening valve 6 to support sample partitioning. The tubing of the system will be a combination of copper tubing, where anti-fouling properties are needed, and PEEK tubing, where chemical inertness is advantageous. The valves and pump will be selected so as to provide anti-fouling and precise control. The manifold 63 is a passive sealing mechanism that uses Buna-N O-rings 66 to create the interface between the manifold and the microfluidic disk. Constant manifold clamping force creates a low-pressure fluidic seal, a regime in which the whole system operates, but still allows the disk 40 to rotate sequentially between testing zones.

2. Proof of Concept: Detection of LAMP Reaction in Microfluidic Device

Loop-mediated isothermal amplification (LAMP) has great potential for sensitive and selective genetic analysis in resource-limited settings. LAMP reactions can be observed optically via turbidity, fluorescence, and colorimetry, but the colorimetric approach balances robust performance with simple instrumentation and perhaps offers the ultimate in low-cost bioanalysis. Color development is based on the following: as a LAMP reaction proceeds (indicating the presence of a specific oligonucleotide target), large amounts of pyrophosphate are produced; the pyrophosphate complexes with magnesium ions in solution and precipitates out. HNB reacts to decreases in free magnesium ion with a color shift. Microfluidic devices incorporating HNB for LAMP detection have not been previously reported. We speculated that a long optical pathlength can enhance the contrast of color changes and make simple colorimetric detection possible in microfluidic devices.

In this example, the microfluidic device is a laminated plastic device fabricated by $CO_2$ laser. The layers comprise 750 μm acrylic or 50 μm adhesive-laminated polyethylene terephthalate.

A layer fitted with a hydrophobic 0.45-μm-pore polypropylene filter disk 24 enables vacuum loading of the wells 22. Loading is as follows (see FIG. 2A-C): An inlet port 27 allows the introduction of LAMP reaction mixture with 1% Triton X-100. Vacuum applied at 28 draws the liquid from the inlet port 27 to the array of wells 21, where the fluid delivery channel 11 (FIG. 1B) sequentially loads 100 nl wells 22 in a bubble-free manner. Fluid is drawn oil inlet port 29 to a liquid reservoir 32, at which point a needle is injected into the oil inlet port 29 enabling the delivery of mineral oil without introducing air.

LAMP reactions were performed off-chip according to the following protocol: A set of LAMP primers including loop primers directed at *Synechocystis* sp. PCC 6803 rbcL gene were mixed with 0.6 ng/10 μl column-purified *Synechocystis* genomic DNA. Primers were designed using PrimerExplorer V4 (Eiken Chemical). Reactions were performed at 70° C. with 120 μm HNB via OmniAmp polymerase (Lucigen Corporation). Negative controls were prepared using mixtures which contained no polymerase, since standard no template controls exhibit altered magnesium activity and starting color compared with positive samples.

Results

LAMP reactions were performed off-chip according to the following protocol: A set of LAMP primers including loop primers directed at *Synechocystis* sp. PCC 6803 rbcL gene were mixed with 0.6 ng/10 μl column-purified *Synechocystis* genomic DNA. Primers were designed using PrimerExplorer V4 (Eiken Chemical). Reactions were performed at 70° C. with 120 μm HNB via OmniAmp polymerase (Lucigen Corporation). Negative controls were prepared using mixtures which contained no polymerase, since standard no template controls exhibit altered magnesium activity and starting color compared with positive samples.

Figure 3A:
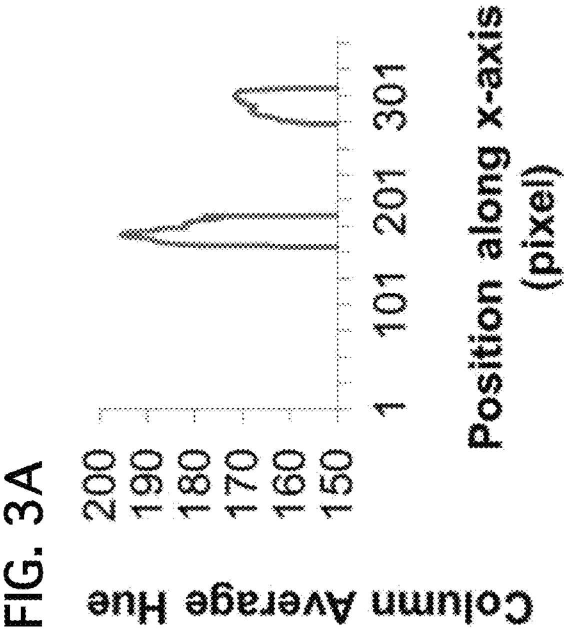
FIGS. 3A and 3B illustrate the detection of HDB in 750 μm-deep wells in response to LAMP reactions.

FIG. 3A illustrate the detection of HNB color in 750-μm deep wells in response to LAMP reactions using a consumer-grade USB microscope. Wells in columns 2 and 3 were loaded with negative and positive LAMP reaction solutions, respectively. The image was processed using a custom vision application wherein users specify image filters and measured. In this case, two filters were employed: a hue-based band-pass filter and an intensity-based band-pass filter. Filtered pixels were overwritten with RGB 0,0,0 and ignored. The average hue along the image's x-axis was computed. FIG. 3A shows that the no-reaction wells contain a distinctly different hue characteristic than the positive wells and illustrate the feasibility of a simple colorimetric microfluidic approach to genetic analysis.

DISCUSSION

The simplest LAMP detection methodology is based on turbidity changes and visual inspection. Visual inspection results can of course vary from user to user and introduce uncertainties in assay results. Although objective electronic tracking of turbidity is possible, sensitivity can be poor and fluidic anomalies (such as bubbles or irregularly depositing reaction product precipitation) can hamper reproducibility. Furthermore, optical path length for turbidity based methods is, in general, prohibitively long for microscale implementations. Colorimetric approaches, on the other hand, offer an increased potential for robustness as changes in lighting intensity or fluidic issues do not necessarily confound the optical information since hue and lighting intensity can be separated. Reaction well geometries, amenable to microscale manufacture, are also possible using colorimetric reagents due to larger extinction coefficients. Fluorescence detection of LAMP reactions, although quite reliable and sensitive, requires additional optical components and therefore increased cost when compared with colorimetric optical setups. Furthermore, owing to the large signal typically created via the LAMP reaction, the sensitivity afforded by fluorescence methods may not be necessary and colorimetric methods in conjunction with sufficiently long optical path lengths may represent the best balance of cost and effectiveness.

Figure 3B:
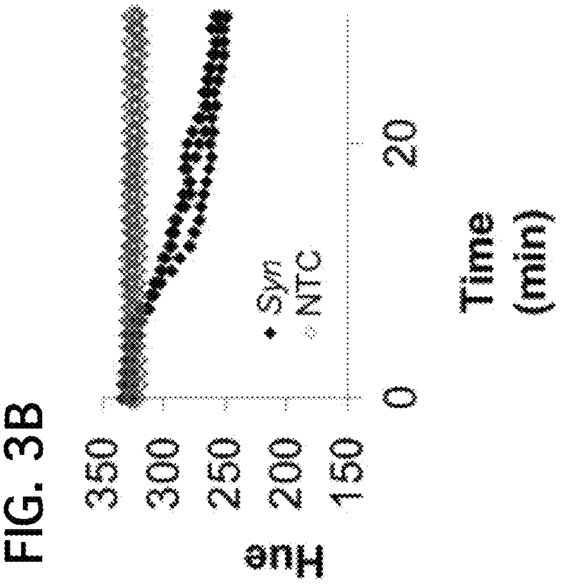

We have also shown real-time detection of color shifts. Real-time data can be used to provide information relative to the quantity of amplification target in a sample. FIG. 3B shows an example of an on-chip, real-time reaction. As the reaction proceeds due to identification of the rbcL gene of *Synechocystis* sp. 6803, the HNB reagent shifts color from violet to blue (hue values from ~330 to ~250). The time of trend separation from baseline (analogous to Ct value in qPCR) and the number of wells reacting can be related to the quantity of target in the sample. Algorithms to automate this process will be established as a component of the 'DNA to answer' deliverable.

Detection of LAMP reaction may be adapted for fluorescence detection approaches.

What is claimed:

1. A microfluidic device comprising:

a fluid delivery channel comprising a plurality of side channels branching from the fluid delivery channel;

an array of wells, wherein the wells are arranged in at least two columns to follow a serpentine flow of the fluid delivery channel and are offset from the fluid delivery channel, and wherein each well of the array comprises:

a hydrophilic coating;

a gas-permeable membrane;

a top opening; and a bottom opening, wherein the bottom opening is sealed by the gas-permeable membrane to form the floor of each well; and a reservoir, wherein the top opening of each well meets the side channel branching from the fluid delivery channel, and wherein the reservoir is below the gas-permeable membrane wherein the plurality of side channels divert a fluid from the fluid delivery channel into two columns of wells.

2. The microfluidic device of claim 1, wherein the aspect ratio of the device is at least 1.

3. The microfluidic device of claim 1, wherein each well of the array is cylindrical.

4. The microfluidic device of claim 1, wherein each well of the array is at least 100 μm tall thereby providing a long optical pathway length for optical detection of the contents of each well.

5. The microfluidic device of claim 4, wherein optical detection comprises colorimetic or turbidimetric measurement.

6. The microfluidic device of claim 4, wherein the width of each well of the array is no more than 2000 μm.

7. The microfluidic device of claim 1, wherein the gas-permeable membrane further forms at least a portion of the wall of each well of the array.

8. The microfluidic device of claim 1, wherein the gas-permeable membrane forms the floor and wall of each well of the array.

9. The microfluidic device of claim 1, wherein the gas-permeable membrane is hydrophobic.

10. The microfluidic device of claim 9, wherein the gas-permeable membrane is polypropylene filter disk with a pore size of between 0.2 to 30 μm.

11. The microfluidic device of claim 10, wherein the polypropylene filter disk has a pore size of 0.45 μm.

12. The microfluidic device of claim 1, wherein the width of the fluid delivery channel is larger than the diameter of each well of the array.

13. The microfluidic device of claim 1, wherein the width of the fluid delivery channel is the same as the diameter of each well of the array.

14. The microfluidic device of claim 1, the microfluidic device further comprising a barrier membrane that may be punctured above the fluid delivery channel, wherein puncturing barrier membrane provides fluid access to the fluid delivery channel.

15. An array disk comprising a plurality of the microfluidic device of claim 1 arranged in a circle around the center of the array disk.

16. The array disk of claim 15, wherein the microfluidic device further comprises a barrier membrane that may be punctured above the fluid delivery channel, wherein puncturing barrier membrane provides fluid access to the fluid delivery channel.

17. An array disk comprising a plurality of the microfluidic device of claim arranged in a circle around the center of the array disk.

18. The microfluidic device of claim 1, wherein the fluid delivery channel has a serpentine order.

19. The microfluidic device of claim 18, wherein the two columns of wells comprise a first column and a second column, and the plurality of side channels divert a fluid from the fluid delivery channel to direct the fluid so that the first column of wells is filled before the second column of wells.

* * * * *